(12) United States Patent
Ha et al.

(10) Patent No.: US 8,682,672 B1
(45) Date of Patent: Mar. 25, 2014

(54) SYNCHRONOUS TRANSCRIPT DISPLAY WITH AUDIO/VIDEO STREAM IN WEB CAST ENVIRONMENT

(75) Inventors: Tommy Ha, San Leandro, CA (US); Kamalaksha Ghosh, Sunnyvale, CA (US)

(73) Assignee: ON24, Inc., San Francisco, CA (US)

( * ) Notice: Subject to any disclaimer, the term of this patent is extended or adjusted under 35 U.S.C. 154(b) by 2856 days.

(21) Appl. No.: 10/944,258

(22) Filed: Sep. 17, 2004

(51) Int. Cl.
 *G10L 21/00* (2013.01)
 *G10L 25/00* (2013.01)
 *G10L 15/00* (2013.01)
 *G10L 21/06* (2013.01)
 *G06F 3/14* (2006.01)

(52) U.S. Cl.
 USPC ........... 704/270; 704/235; 704/276; 715/201; 715/203; 715/500.1

(58) Field of Classification Search
 None
 See application file for complete search history.

(56) References Cited

U.S. PATENT DOCUMENTS

| | | | |
|---|---|---|---|
| 5,388,197 A * | 2/1995 | Rayner | 715/723 |
| 5,732,216 A * | 3/1998 | Logan et al. | 709/203 |
| 5,801,685 A * | 9/1998 | Miller et al. | 715/202 |
| 6,404,978 B1 * | 6/2002 | Abe | 386/55 |
| 6,523,022 B1 * | 2/2003 | Hobbs | 707/3 |
| 6,601,026 B2 * | 7/2003 | Appelt et al. | 704/9 |
| 6,636,237 B1 * | 10/2003 | Murray et al. | 715/719 |
| 6,714,909 B1 * | 3/2004 | Gibbon et al. | 704/246 |
| 6,801,224 B1 * | 10/2004 | Lewallen | 715/746 |
| 6,920,181 B1 * | 7/2005 | Porter | 375/240.28 |
| 7,096,416 B1 * | 8/2006 | Smith et al. | 715/203 |
| 2004/0125877 A1 * | 7/2004 | Chang et al. | 375/240.28 |

* cited by examiner

*Primary Examiner* — Pierre-Louis Desir
*Assistant Examiner* — Matthew Baker
(74) *Attorney, Agent, or Firm* — DLA Piper LLP (US)

(57) ABSTRACT

A system and method is described that permits synchronization of a transcript with an audio/video stream of a webcast. The system also permits a user to perform a search of the transcript and then to jump in the webcast audio/video stream to the point identified during the search.

8 Claims, 12 Drawing Sheets

```
//the offset is the number of milliseconds that have elapsed      ⎰ 182
//since the Media Player has started playing.
function transcript(offset, text) {
    this.offset = offset;
    this.text = text;
}
var transcriptArray = new Array();
transcriptArray[0] = new transcript(0,"first text line");
transcriptArray[1] = new transcript(1000,"second text line");
transcriptArray[2] = new transcript(2000,"next text line");
```

FIGURE 10

```
//The html page will call    tOnDemand() on startup.
var interval = 50;  //this    1 be arbitrary
function startOnDemand() {
    var position = this.player.getPosition();
    this.processTranscript(position);
    setTimeout(this.name+".startOnDemand()",this.interval);
}
function processTranscript(position){
//handle transcripts
 if(typeof window.top.main.transcriptArray+""!="undefined"){
  var
searchTextElement=this.getElementFromDoc("window.top.main","document.transcriptForm","searchText"
);
  if(searchTextElement!=null){
    if(searchTextElement.value!="") this.transcriptEnabled=false;
    else this.transcriptEnabled=true;
  }
  if(this.transcriptEnabled){
    for (var i=0;i<window.top.main.transcriptArray.length;i++) {
     if (position < window.top.main.transcriptArray[i].offset) {
       if (i>0 && i!=(this.currentTranscriptLine-(-1))) {
        //alert(i!=this.currentTranscriptLine)
        this.currentTranscriptLine=i-1;
        var
strTranscriptFrameSRC="http://"+staticHost+"/clients/default/presentation/transcript.html?lineno=
"+this.currentTranscriptLine+"#line"+this.currentTranscriptLine;
        if (bIE) {
         if(this.doc.transcript_frame)
this.doc.transcript_frame.location.href=strTranscriptFrameSRC;
        } else {
         //alert(getObjByName(this.doc,"transcript_frame"))
         if(getObjByName(this.doc,"transcript_frame"))
getObjByName(this.doc,"transcript_frame").src=strTranscriptFrameSRC;
        }
       } else if(i==0 && this.transcriptLoaded==false){
        this.transcriptLoaded=true;
        var
strTranscriptFrameSRC="http://"+staticHost+"/clients/default/presentation/transcript.html";
        if (bIE) {
         if(this.doc.transcript_frame)
this.doc.transcript_frame.location.href=strTranscriptFrameSRC;
        } else {
         //alert(getObjByName(this.doc,"transcript_frame"))
         if(getObjByName(this.doc,"transcript_frame"))
getObjByName(this.doc,"transcript_frame").src=strTranscriptFrameSRC;
        }
       }
       break;
      }
    }
  }
 }
}
function startSearch(){
 if(typeof window.top.main.transcriptArray+""!="undefined"){
  var
searchTextElement=this.getElementFromDoc("window.top.main","document.transcriptForm","searchText"
);
  if(searchTextElement==null) return false;
  if(searchTextElement.value=="") return false;

var
strTranscriptFrameSRC="http://"+staticHost+"/clients/default/presentation/transcript.html?mode=se
arch&s=" +escape(searchTextElement.value)+"#match1"
  if (bIE) {
    if(this.doc.transcript_frame) this.doc.transcript_frame.location.href=strTranscriptFrameSRC;
  } else {
    if(getObjByName(this.doc,"transcript_frame"))
getObjByName(this.doc,"transcript_frame").src=strTranscriptFrameSRC;
  }
 }
}
function clearSearch(){
 var
searchTextElement=this.getElementFromDoc("window.top.main","document.transcriptForm","searchText"
);
 if(searchTextElement==null) return false;
 searchTextElement.value="";
}
```

FIGURE 12A

```
<html>
<head>
        <title>Search</title>
<style>
.transcript{
font-family:verdana;
font-size:11px;
color:000000;
background-color:ffffff;
}
.transcriptline{
background-color:ffffcc;
color:000000;
text-decoration:none;
}
.transcriptmatch{
background-color:ffffcc;
color:000000;
text-decoration:none;
}
</style>
<script language="JavaScript">
if(window.top.main.playerStyle.indexOf("transcript")!=-1)
document.writeln(window.top.main.playerStyle);
</script>
<script language="JavaScript">

//read passed parameters
var paramObj=new Object();
paramObj.lineno=-1;
paramObj.mode="sync";
var qstring=location.search;
if(qstring.indexOf("#")>1) qstring=qstring.substring(1,qstring.indexOf("#"));
else qstring=qstring.substring(1);
var pairs=qstring.split("&");
for(var i=0;i<pairs.length;++i){
 var pairsplit=pairs[i].split("=")
 paramObj[pairsplit[0]]=pairsplit[1];
} function gotoPos(offset){
    if(window.top.main.epl){
        if(window.top.main.epl.player.canPlay())
            window.top.main.epl.player.play();
        window.top.main.epl.player.setPosition(
           Math.round(offset/1000));

if(window.top.main.epl.paramObj.format.indexOf("wm")!=-1)
           window.top.main.epl.player.play();
    }
}
```

FIGURE 12B1

```
</script>
</head>
<body bgcolor="#ffffff">
<script language="JavaScript">
var transcriptArrayFromTop = new Array();
if(typeof window.top.main.transcriptArray+""!="undefined") transcriptArrayFromTo
p=window.top.main.transcriptArray;
var transcriptContent="";
for(var i=0;i<transcriptArrayFromTop.length-1;i++){
  if(paramObj.mode=="sync"){
  if(i==paramObj.lineno)
      transcriptContent+="<a name='line"+i+
          "' href='#line"+i+"'onclick='gotoPos("+
          transcriptArrayFromTop[i].offset+")' class=transcriptline>"+
          transcriptArrayFromTop[i].text+"</a>";
  else transcriptContent+=transcriptArrayFromTop[i].text;
  } else if(paramObj.mode=="search"){
      var searchText=unescape(paramObj.s);
      var searchTextRE=searchText.replace(/\\/gi,"\\\\");
      searchTextRE=searchTextRE.replace(/\|/gi,"\\|");
      searchTextRE=searchTextRE.replace(/\//gi,"\\/");
      searchTextRE=searchTextRE.replace(/\[/gi,"\\[");
      searchTextRE=searchTextRE.replace(/\]/gi,"\\]");
      searchTextRE=searchTextRE.replace(/\*/gi,"\\*");
      searchTextRE=searchTextRE.replace(/\?/gi,"\\?");
      searchTextRE=searchTextRE.replace(/\./gi,"\\.");
      searchTextRE=searchTextRE.replace(/\+/gi,"\\+");
      searchTextRE=searchTextRE.replace(/\(/gi,"\\(");
      searchTextRE=searchTextRE.replace(/\)/gi,"\\)");
      searchTextRE=searchTextRE.replace(/\^/gi,"\\^");
      searchTextRE=searchTextRE.replace(/\$/gi,"\\$");
      eval("var re=new RegExp(/"+searchTextRE+"/gi)");

transcriptContent+=
      transcriptArrayFromTop[i].text.replace(re,
          "<a name='match1' href='#match1'
onclick='gotoPos("+transcriptArrayFromTop[i].offset+")'
class=transcriptmatch>"+searchText+"</a>");

} else transcriptContent+=transcriptArrayFromTop[i].text;
}
document.write("<span class=transcript>"+transcriptContent+"</span>")
</script>
</body>
</html>
```

FIGURE 12B2

SYNCHRONOUS TRANSCRIPT DISPLAY WITH AUDIO/VIDEO STREAM IN WEB CAST ENVIRONMENT

FIELD OF THE INVENTION

The invention relates generally to a computer system and in particular to a web casting system and method.

BACKGROUND OF THE INVENTION

A system that permits two or more users to interact with each other over a computer network are well known. Some of the systems are not "real-time", such as e-mail messages while others approach real-time such as chat sessions. There are also systems that permit a live streaming video or audio-visual presentation, such as a webcast, to be distributed to a plurality of user over a computer network. In these systems, each user is able to interact with the presenters in real-time in a video conference.

It is desirable to provide the ability for a user of a streaming video or audiovisual presentation to synchronize a textual transcript with the audiovisual presentation. Thus, it is desirable to be able to display a textual transcript that is synchronized with the audio/video stream. The synchronization of the transcript with the audio/video stream permits a user to more easily follow a presentation and has other benefits. Thus, it is desirable to provide a system and method for synchronizing a transcript with an audio/video stream of a webcast, and it is to this end that the present invention is directed.

SUMMARY OF THE INVENTION

An apparatus and method for synchronizing a textual transcript with an audiovisual presentation is provided. The invention permits the user receiving the audiovisual presentation to more easily follow the presentation. Furthermore, as the speaker conversation progresses, the current synchronized text will be highlighted for easier viewing so that the user may more easily track the presentation and refer to the transcript when a question arises. In accordance with the invention, the transcript may encompass the entire presentation. The inventive systems also allows the audience to quickly locate the current conversation within the paragraphs or text lines. In addition, the user can perform a search of a string in the transcript textbox during the presentation. The method may highlight matching strings in the transcript textbox so that the user may select a particular piece of highlighted text which will cause the presentation to jump to the portion of the presentation identified by the highlighted text selected by the user. The apparatus and method may also be used by a hearing impaired person to "listen to" an audio/video presentation since the hearing impaired person is able to follow along with the presentation based on the transcript.

BRIEF DESCRIPTION OF THE DRAWINGS

FIG. 10 illustrates an example of a transcript array in accordance with the invention;

FIGS. 12A, 12B1 and 12B2 illustrate examples of the Javascript code that may be use to implement the transcript synchronization in accordance with the invention.

DETAILED DESCRIPTION OF A PREFERRED EMBODIMENT

The invention is particularly applicable to a web cast system in which a text transcript is synchronized to an audio/video stream of the web cast delivered over the World Wide Web and it is in this context that the invention will be described. It will be appreciated, however, that the system and method in accordance with the invention has greater utility since it may be used, more generally, to synchronize any transcript with any type of media, such as audio or audiovisual media and in any system in which it would be desirable to synchronize a transcript with a piece of media. Prior to describing the details of the apparatus in accordance with the invention, an overview of a web-casting system in which the invention is preferably used is described.

Figure 1:
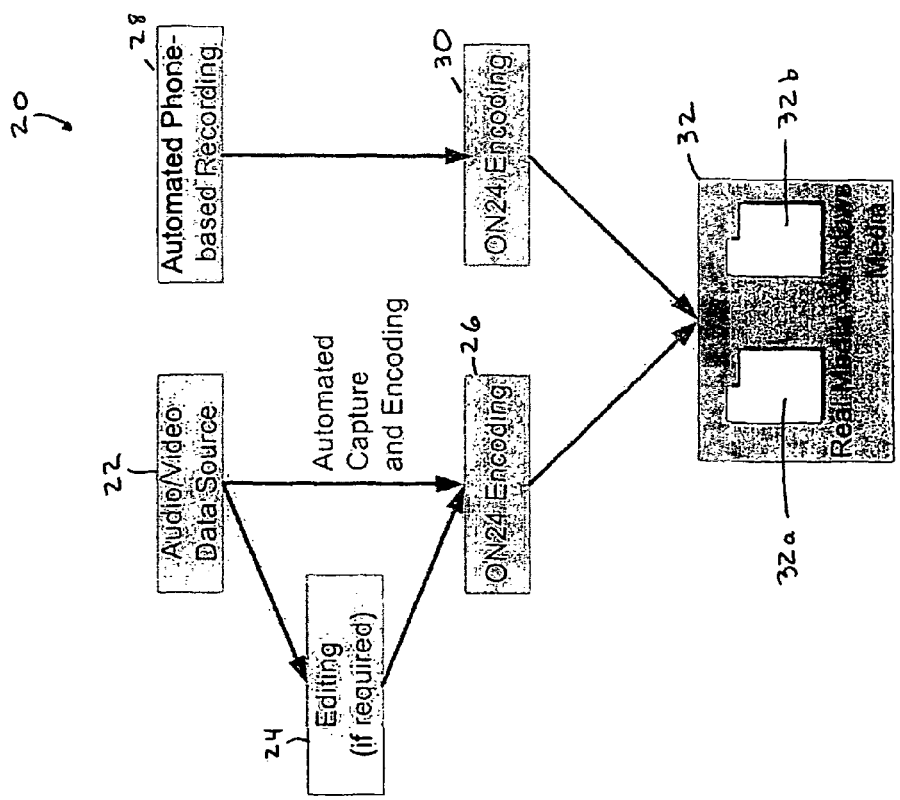
FIG. 1 is a diagram illustrating a method for asset acquisition for a web casting system into which the synchronization apparatus may be incorporated.

FIG. 1 is a diagram illustrating a method 20 for asset acquisition for a web casting system into which the synchronization apparatus may be incorporated. As shown, an audio/video or audio data source 22 is edited in step 24 if necessary or is automatically captured. In step 26, the data source 22 is encoded. Alternatively, an automated phone-based recording source 28 is encoded in step 30. The encoded data may then be stored in a media database 32, such as in a real media format 32a and/or a windows media format 32b. In this manner, a data source/piece of media is prepared for distribution using a web casting system, an example of which is shown in FIG. 2.

Figure 2:
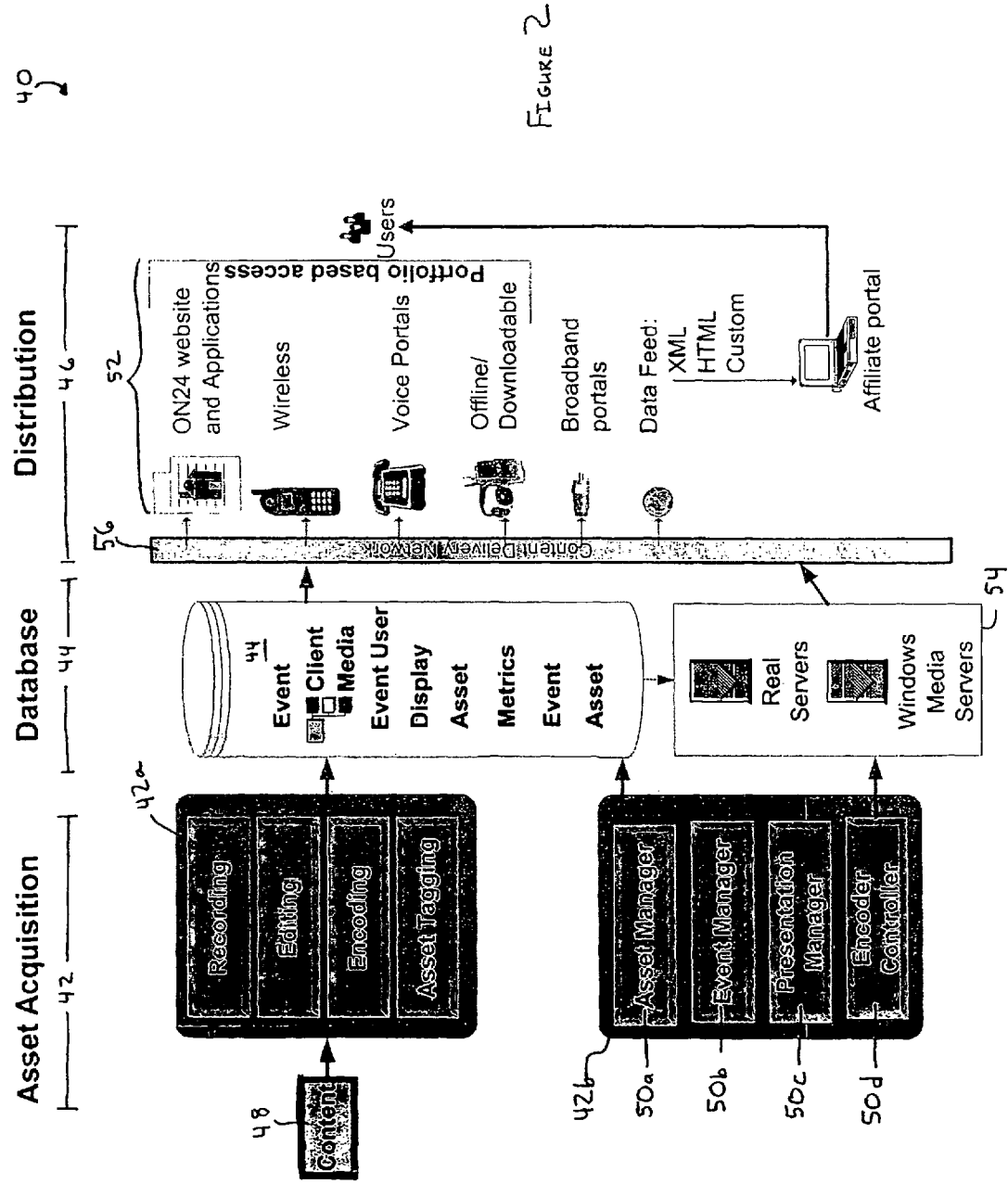
FIG. 2 is a diagram illustrating a web casting system into which the synchronization apparatus may be incorporated.

FIG. 2 is a diagram illustrating a web casting system 40 into which the synchronization apparatus may be incorporated. The web casting system 40 may comprise an asset acquisition and event management portion 42, a database portion 44 and a distribution portion 46 wherein a piece of media/content 48 is input into the web casting system 40 in order to distribute that content/piece of media during a web cast. Generally, each element of the web casting system being described is implemented in software wherein each portion may be one or more software modules and each software modules may be a plurality of computer instructions being executed to perform a particular function/operation of the system. Each element of the system may thus be implemented as one or more computer resources, such as typical personal computers, servers or workstations that have one or more processors, persistent storage devices and memory with sufficient computing power in order to store and execute the software modules that form the web casting system in accordance with the invention. The web casting may generate a web cast that is provided to one or more web cast clients 52 wherein each client is a computing resource, such as a personal computer, workstation, cellular phone, personal digital assistant, wireless email device, telephone, etc. with sufficient computing power to execute the web casting client located on the client wherein the client communicates with the web cast system over a wired or wireless connection.

In more detail, the asset acquisition and event management portion 42 may further comprise an asset acquisition portion 42a and an event management portion 42b wherein the asset acquisition portion performs one or more of the following functions: recording of the piece of media/content, editing of the piece of media/content, encoding of the piece of media/content and asset tagging. The event manager module 42b further comprises an asset manager module 50a, an event manager module 50b, a presentation manager module 50c and an encoder controller 50d. The asset manager module 50a, prior to a web cast, imports/exports content/pieces of media into/from a library of media as needed and manages the assets for each web cast presentation. The event manager module 50b may perform actions/function prior to and after a web cast. Prior to a particular web cast, the event manager module may reserve the event in the system (both resources and access points), set-up an event console which a user interacts with to manage the web cast and then send messages to each recipient of the upcoming web cast with the details of how to access/operate the web cast. After a particular web cast, the event manager module 50b may permit a user to import an old web cast presentation into the system in order to re-use one or more pieces of the old web cast presentation. The presentation manager module 50c, during a particular web cast presentation, generates a web cast file with the slides of the web cast presentation, URLs and polls to an encoder controller to distribute the particular web cast presentation to the users. The encoder controller 50d encodes the web cast presentation stream to one or more distribution server 54 that distributes the web cast presentation to the users.

As shown in FIG. 2, the database 44 may include data about each event/web cast, including the clients to which the web cast is being provided and the media associated with the web cast, one or more event users, the display of the particular event, the assets associated with the event, the metrics for the event and other event data. In combination with this data in the database for a particular event, operations and commands from the event manager module 42b are downloaded to the distribution servers 54 that distribute each event to each client 52 for the particular event over a distribution network 56. As shown, the web cast event/presentation may be distributed to one or more different clients 52 that use one or more different methods to access the event/web cast. The clients 52 may include a client that downloads the presentation/web cast and then views the presentation/web cast offline.

Figure 3:
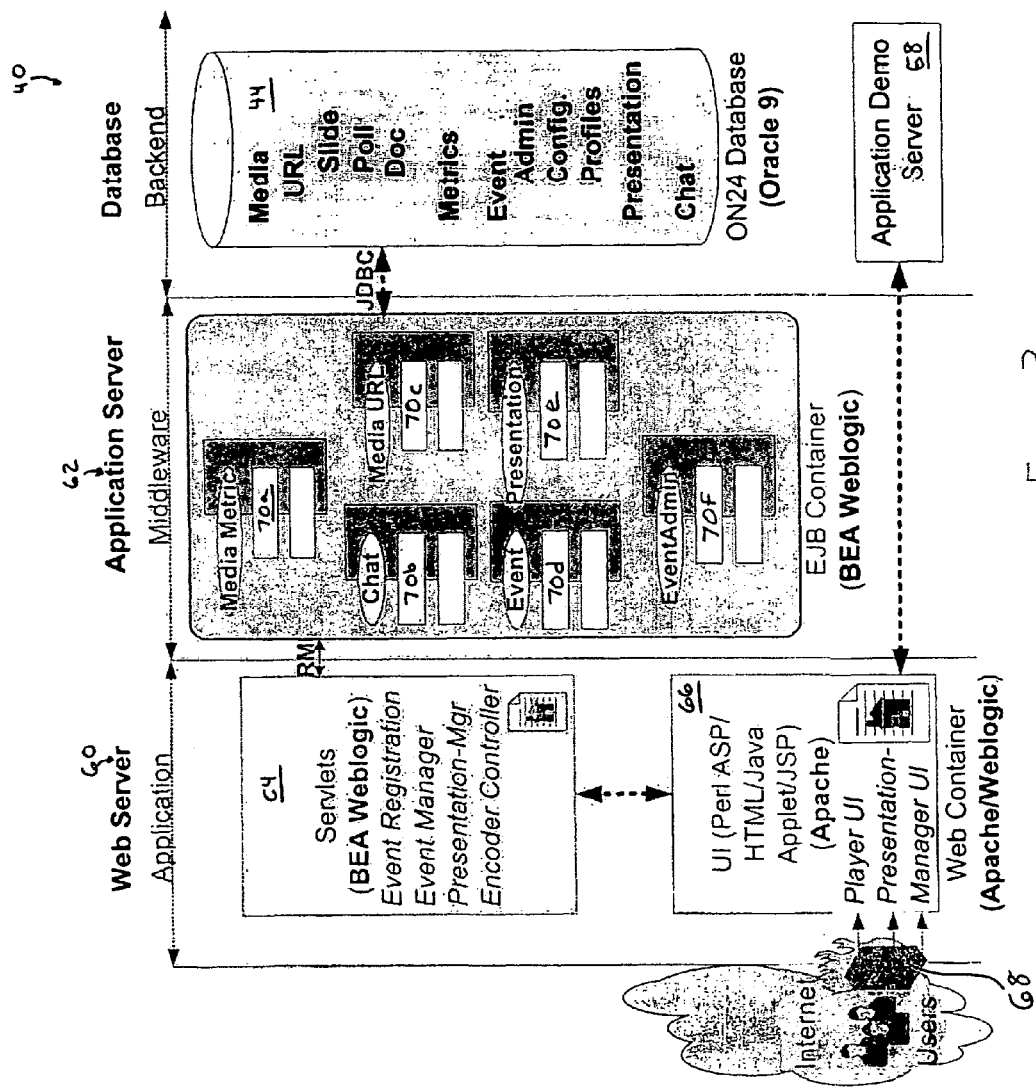
FIG. 3 illustrates a system architecture of the web casting system shown in FIG. 2.

FIG. 3 illustrates more details of the web casting system shown in FIG. 2. The web casting system may include a web server portion 60, an application server portion 62 and the database portion 40 (with the database 44) shown in FIG. 2. Each of these portions may be implemented as one or more computer resources with sufficient computing resources to implement the functions described below. In a preferred embodiment, each portion may be implemented as one or more well known server computers. The web server portion 60 may further comprise one or more servlets 64 and a web container portion 66 which are both behind a typical firewall 68. In a preferred embodiment of the invention, the servlets reside of a BEA Weblogic system which is commercially available and may include an event registration servlet, an event manager module servlet, a presentation manager module servlet and an encoder controller servlet that correspond to the event manager module 50b, presentation manager module 50c and encoder controller 50c shown in FIG. 2. Each of these servlets implement the functions and operations described above for the respective portions of the system wherein each servlet is a plurality of lines of computer code executed on a computing resource with sufficient computing power and memory to execute the operations. The servlets may communicate with the application server portion 62 using well known protocols such as, in a preferred embodiment, the well known remote method invocation (RMI) protocol. The servlets may also communicate with the web container portion 66 which is preferable implemented using an well known Apache/Weblogic system. The web container portion 66 generates a user interface, preferably using Perl Active Server Page (ASP), HTML, Java Applet, Javascript and Java Server Pages (JSPs.) The web container portion 66 may thus generate a user interface for each client and the presentation manager module user interface. The user interface generated by the web container portion 66 may be output to the clients of the system through the firewall as well as to an application demo server 68 that permits a demo of any presentation to be provided.

The application server portion 62 may preferably be implemented using an Enterprise JavaBeans (EJBs) container implemented using a BEA Weblogic product that is commercially sold. The application server management portion 62 may be known as middleware and may include a media metric manager 70a, a chat manager 70b, a media URL manager 70c, an event manager 70d, a presentation manager 70e and an event administration manager 70f which may each be software applications performed the specified management operations. The application server portion 62 communicates with the database 44 using a protocol, such as the well known Java Database Connectivity (JDBC) protocol in a preferred embodiment of the invention. The database 44 may preferably be implemented using an Oracle 8/9 database product that is commercially available. As shown, the database 44 may include media data including URL data, slide data, poll data and document data. The database 44 may further include metric data, event data and chat data wherein the event data may further preferably include administration data, configuration data and profile data.

Figure 4:
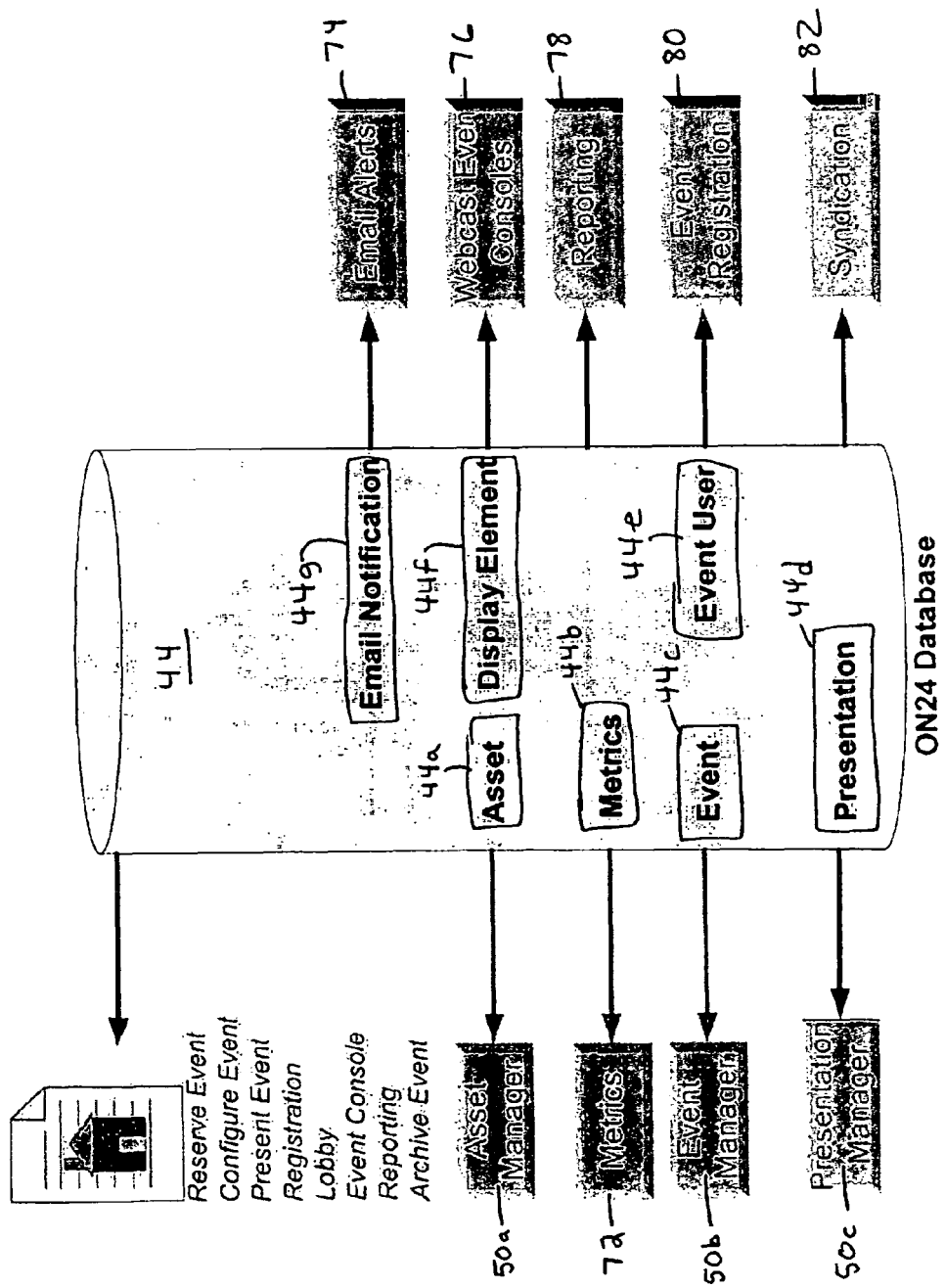
FIG. 4 is a functional diagram of the interacting components of the web casting database in FIG. 3.

FIG. 4 is a diagram illustrating more details of the web casting database 44 in FIG. 3. As shown in FIG. 4, the database may generate data that is used to implement a function to reserve an event, to configure an event, a present an event, for registration, for the lobby, for the event console, for reporting and for archiving an event. The database may include asset data 44a that may be provided to the asset manager module 50a, metrics data 44b that is provided to a metric module 72, event data 44c that is provided to the event manager module 50b, presentation data 44d that is provided to the presentation manager module 50c, event user data 44e that is provided to an event registration module 80, display element data 44f that is provided to a webcast event consoles module 76 and email notification data 44g that is provided to an email alerts module 74. The database may also store data that is used by a reporting module 78 to generate reports about the events and presentations provided by the system. The database may also store data that is used by a syndication module 82 to syndicate and replicate existing presentations.

Figure 5:
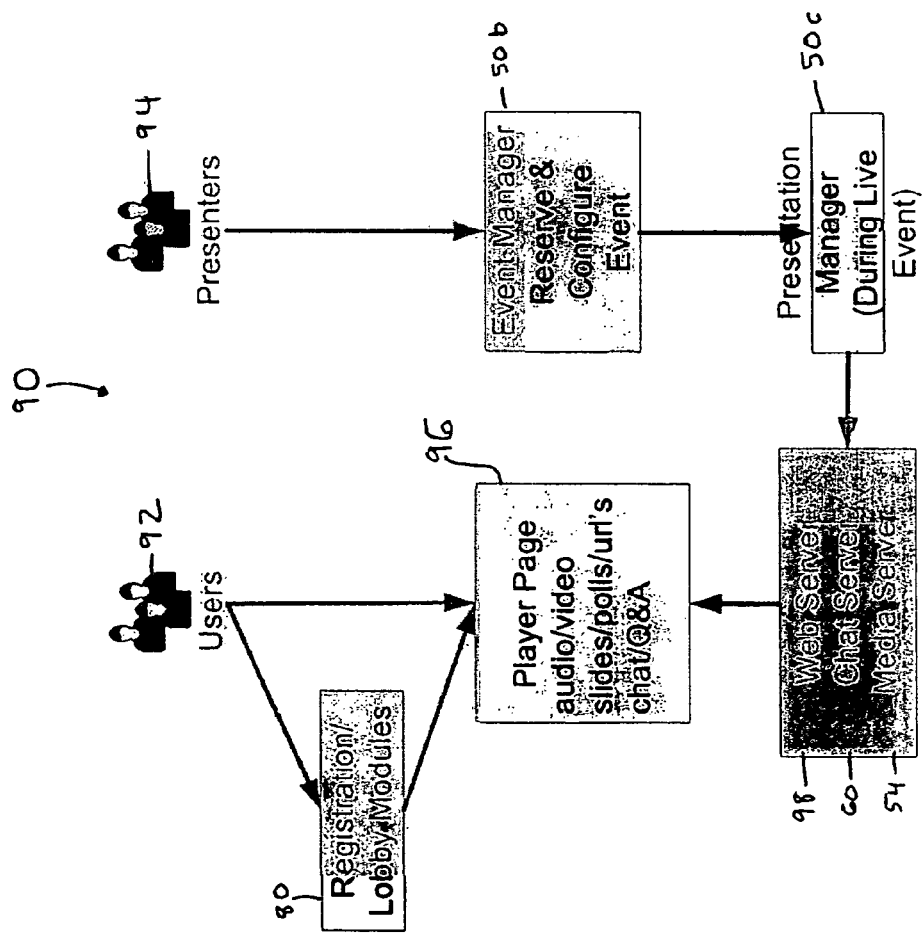
FIG. 5 is a diagram illustrating a presentation workflow.

FIG. 5 is a diagram illustrating a webcast center 90 that may be utilized by one or more users 92 that are presented with a presentation by the system and one or more presenters 94 who utilize the system to present presentations to the users 92. The users 92 may interact with a registration and lobby modules 80 that permit the users to register with the system and schedule a presentation to view. In response to a successful registration, the user may be presented with a player page 96, such as a web page provided to a client computer of the user, that provides the audio and visual data for the presentation, slides, polls and URLs for the presentation, chat sessions and question and answers for a particular presentation. The data in the player page 96 is provided by the web server 60, the media server 54 and a chat server 98 that provides the chat functionality for a presentation. The presentation data for a live event presentation is provided to the servers 54, 60 and 98 by the presentation manager module 50c. The presenters 94 may utilize the event manager module 50b to reserve an event and/or configure an event. Once the event is reserve and configured, the presentation data is forwarded to the presentation manager module 50c.

Figure 6:
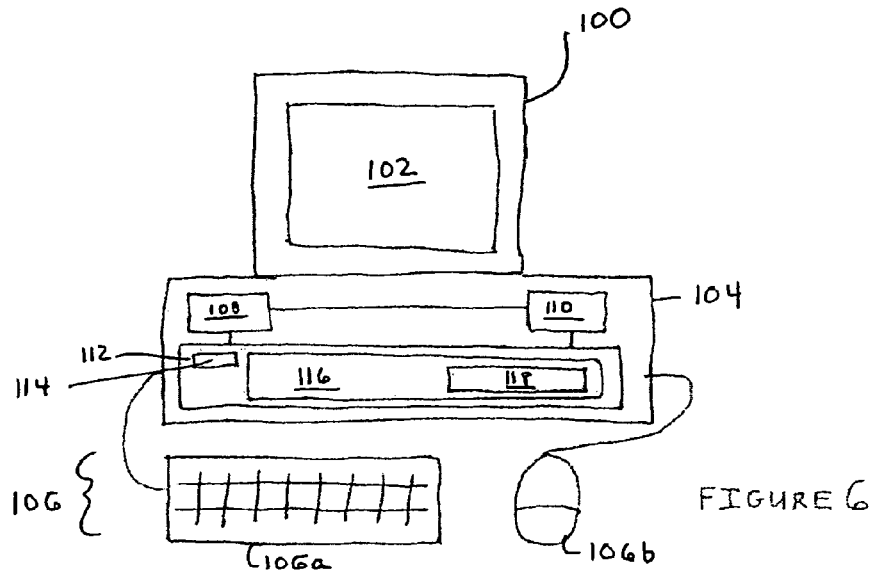
FIG. 6 is a diagram illustrating an example of a webcast client in accordance with the invention that may incorporate the synchronization apparatus.

FIG. 6 is a diagram illustrating an example of a webcast client 100 in accordance with the invention that may incorporate the synchronization apparatus. The webcast client 100 may be implemented as a personal computer, workstation, PDA, cellular phone and the like with sufficient computing power to implement the functions of the client as described below. In the example shown in FIG. 6, the webcast client may be a typical personal computer that may further comprise a display unit 102, such as a CRT or liquid crystal display or the like, a chassis 104 and one or more input/output devices 106 that permit a user to interact with the client 100, such as, for example, a keyboard 106a and a mouse 106b. The chassis 104 may further include one or more processors 108, a persistent storage device 110, such as a hard disk drive, optical disk drive. tape drive, etc., and a memory 112, such as SRAM, DRAM or flash memory. In a preferred embodiment, the client is implemented as one or more pieces of software stored in the persistent storage device 110 and then loaded into the memory 112 to be executed by the processor(s) 108. The memory may further include an operating system 114, such as Windows, and a typical browser application 116, such as Microsoft Internet Explorer or Netscape Navigator and a webcast module 118 (including a transcript synchronization module) that operates within the browser application. In a preferred embodiment, the webcast module 118 may further comprise a plurality of computer instructions, such as Java code as shown in FIGS. 12A and 12B, that implement the client side of the webcast presentation. In accordance with the invention, the client side of the transcript synchronization system/apparatus is implemented as Java code that is downloaded/streamed to the client 100 during/prior to each presentation so that the transcript synchronization does not require a separate client software downloaded to the client. Now, a method for transcript synchronization in accordance with the invention will be described which is implemented in the webcast module 118 and in particular in the transcript synchronization module.

Figure 7:
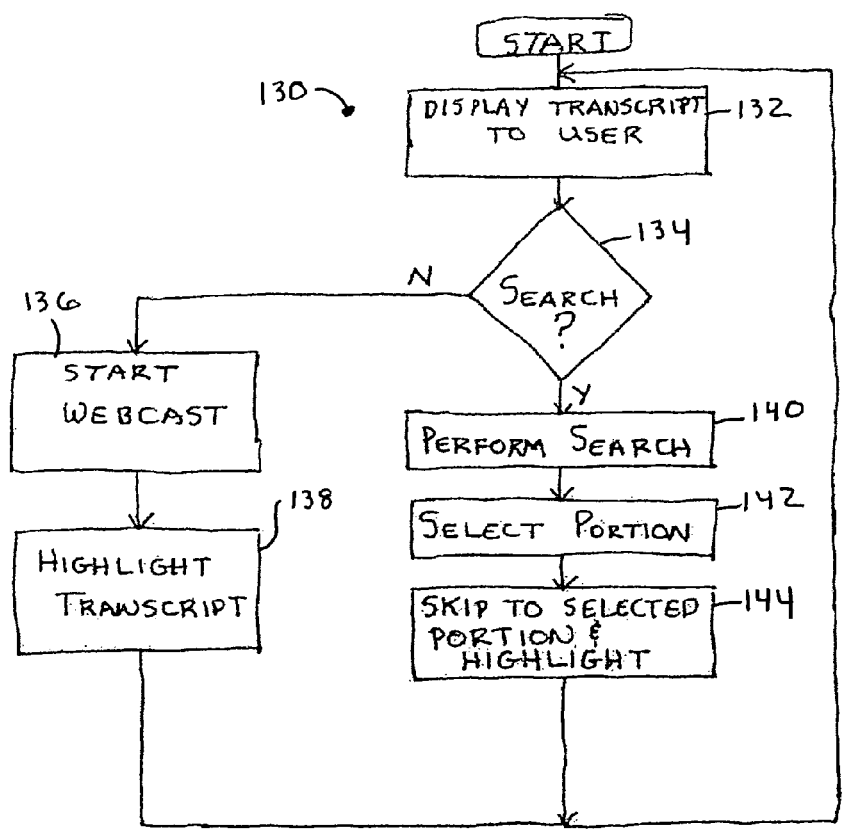
FIG. 7 is a flowchart illustrating a method for synchronizing a transcript with an audio/video stream in accordance with the invention.
Figure 8:
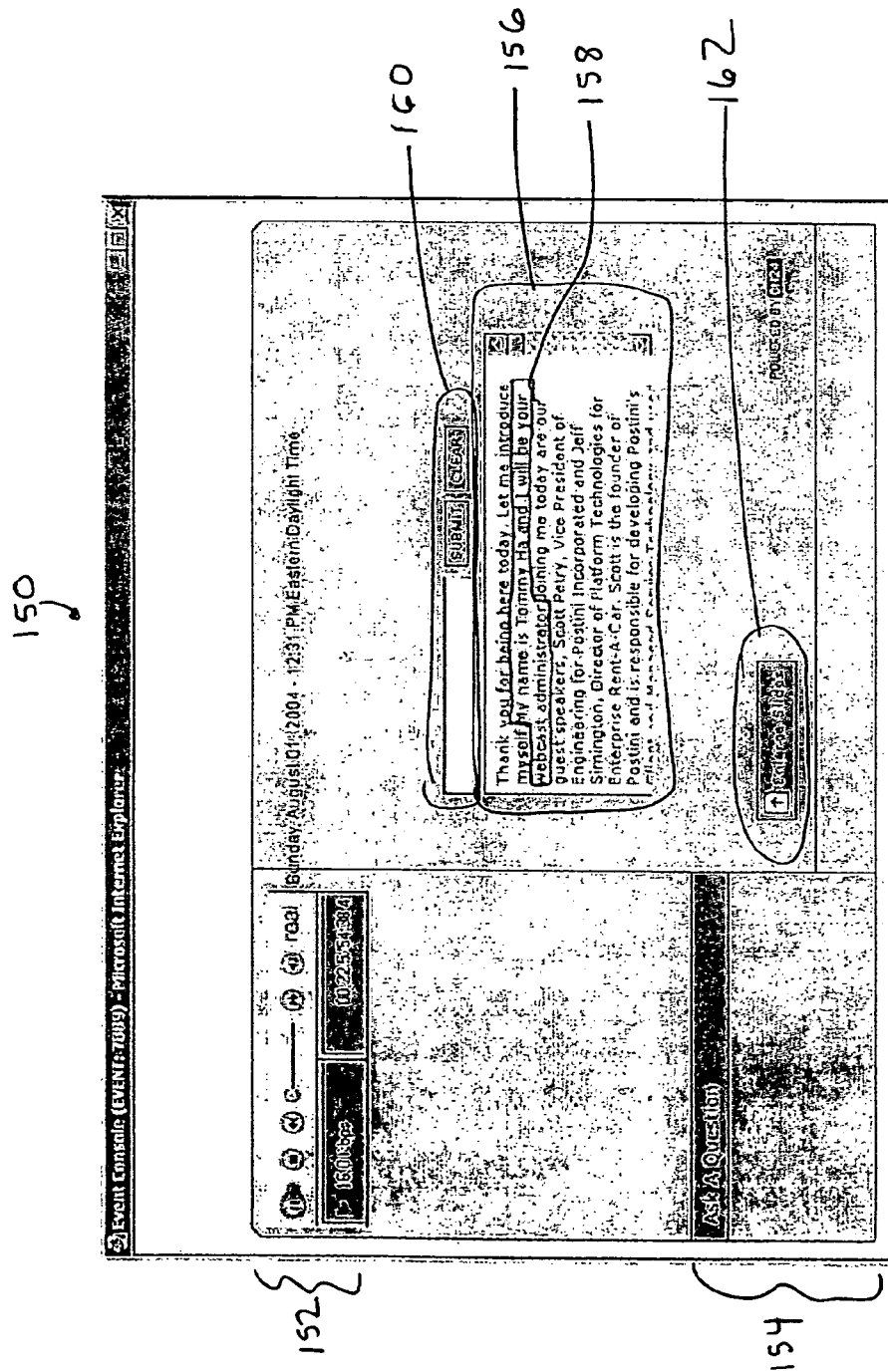
FIG. 8 is a screen shot illustrating an example of the user interface for the highlighted audio/video stream transcript in accordance with the invention.

FIG. 7 is a flowchart illustrating a method 130 for synchronizing a transcript with an audio/video stream in accordance with the invention and FIG. 8 is a screen shot 150 illustrating an example of the user interface for the highlighted audio/video stream transcript in accordance with the invention. Further detail of the synchronization method are set forth in FIG. 9. In step 132, the client displays a transcript to the user as shown in FIG. 8. In the example shown in FIG. 8, the client implemented using a real network media player is shown. The user interface may include a control portion 152 that permits control of a webcast presentation, a question and answer portion 154 and a transcript portion 156 that display the text transcript of a webcast presentation. In a preferred embodiment, the transcript for the entire presentation is generated prior to the presentation and then downloaded to the client with the presentation. The transcript portion 156 may include a highlighted portion 158 which highlights the currently presented portion of the audiovisual presentation. As the audiovisual presentation progresses, the highlighted portion progresses through the transcript so that a user may more quickly track the presentation. Thus, as depicted in FIG. 8, the transcript is being highlighted as the conversation progresses (being played via Real Player on top left) and the transcript textbox also allows the users to scroll up and down through the transcript in addition to a specific text search. The user interface may further include a search portion 160 that permits the user to perform a word/phrase search of the transcript to locate a particular portion of the presentation. When the search results are returned, the transcript may reposition the highlighting over the searched for word/phrases with the transcript corresponding to the entire presentation. The user may then select a particular piece of highlighted text in the transcript and the audiovisual presentation will be moved to the proper place in the presentation corresponding to the piece of selected highlighted text. Thus, the system permits the user to search for a particular portion of an audiovisual presentation (based on the transcript text) and then move to that particular portion of the audiovisual presentation. The user interface may further comprise a slide portion 162.

Returning to FIG. 7, it is determined if the user is performing a text search in step 134. If the user is not performing a text search, then in step 136, the webcast is started/continued and the relevant portion of the transcript (corresponding to the current location in the audiovisual presentation) is highlighted in step 138. If the user performs a search, then in step 140, a search is performed and a portion of the transcript is selected in step 142. In step 144, the audiovisual presentation moves to the selected portion and the relevant portion of the transcript is highlighted.

In accordance with the invention, the above method may be implemented using JavaScript to control the timings of the display. Thus, during the initial load of a web page for the particular presentation, the JavaScript retrieves the transcript file from the web server to the client 100. The transcript file will have a time interval associated for each text line, where a line is a block of text that will be highlighted based on its time interval. For example:

00:00:02:00 Thank you for being here today. Let me introduce myself.

00:00:22:00 My name is Tommy Ha and I will be your webcast administrator.

The first line indicates that at :02 second, highlight the text line "Thank you for being here today. Let me introduce myself." The script will keep on iterating through the transcript and highlight the text based on the time interval as described in more detail below with reference to FIG. 9. In accordance with another embodiment of the invention, Java applets may be used to display the transcript. In accordance with the preferred embodiment of the invention, the Javascript is very lightweight and does not require a Java JVM on the client side.

Figures 9, 11:
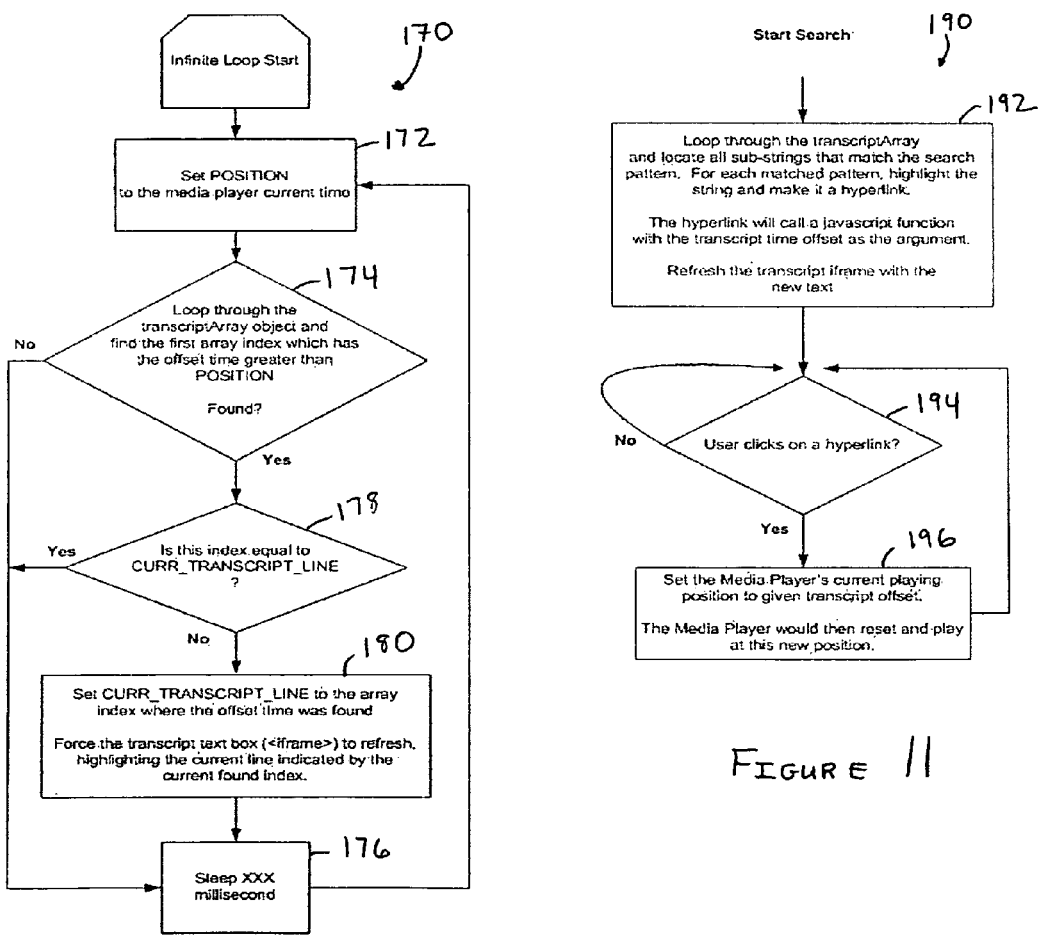
FIG. 9 is a flowchart illustrating a preferred method for synchronizing the transcript with a video stream in accordance with the invention.
FIG. 11 is a flowchart illustrating a preferred method for searching for a transcript portion in accordance with the invention.

FIG. 9 is a flowchart illustrating a preferred method 170 for synchronizing the transcript with a video stream in accordance with the invention. In accordance with the invention, this method as well as the one shown in FIG. 11 are preferably implemented as one or more pieces of software code wherein the executing of a plurality of line of computer code implement the functions and steps shown in the figures. In this method, the hypertext mark-up language (HTML) page downloaded to the user when the user view an audiovisual presentation (the player page) uses a well known inline frame (iframe) to dynamically reload the transcript text. Thus, when a user first goes to the player page, a media player is launched to play the audio/video file from the beginning. Returning to FIG. 9, the global variables for the method are "POSITION" which is the media player time offset for a particular portion of the audio/video file and "CURR_TRANSCRIPT_LINE" which is the current line of the transcript. In step 172, the variable POSITION is set to the media player current time. In step 174, the software implementing the method (shown in FIGS. 12A and 12B) loops through a transcript array object 182, an example of which is shown in FIG. 10, and attempts to find the first array index which has the offset time greater than the POSITION variable (indicating that the transcript text at the index proceeds the current position of the audio/visual media.) If an array index is not found that satisfies the criteria above, then in step 176, the synchronization method goes to sleep for a predetermined number of microseconds and then loops back to step 172 to start the synchronization process again.

If an array index is found that satisfies the criteria above, then in step 178, the method determines if the located index is equal to the CURR_TRANSCRIPT_LINE (indicating that the transcript is properly synchronized to the audio/visual presentation) and loops to step 176 if the index is equal. If the located index is not equal, then in step 180, the CURR_TRANSCRIPT_LINE variable is set to the array index when the offset time was found so that the transcript and presentation are once again synchronized. In step 180, the transcript text box (<iframe>) is also forced to refresh so that the current line indicated by the current found index is highlighted. In this manner, the synchronization between the text transcript and the audio/visual presentation is maintained during the presentation even when the user moves to any portion of the presentation.

FIG. 11 is a flowchart illustrating a preferred method 190 for searching for a transcript portion in accordance with the invention. In step 192, the method loops through the transcript array to locate all sub-strings that match the search pattern entered by the user into the user interface shown in FIG. 8. For each matched pattern, the string is highlighted and made into a hyperlink. Each hyperlink in the transcript will call a javascript function (shown in FIG. 12A) with the time offset as the argument. The method will also refresh the transcript iframe with the new text. In step 194, the method determines if the user has clicked on any hyperlink and loops back to step 194 is no hyperlink has been selected. If a particular hyperlink has been selected, then the method, in step 196, sets the media player's current playing position to the transcript offset contained in the hyperlink corresponding to the piece of text to which the user would like to jump. The media player may then be reset and start playing the presentation at the new position with the transcript synchronized to that new position based on the transcript text selected by the user.

FIGS. 12A, 12B1 and 12B2 illustrate examples of the Java code that may be use to implement the transcript synchronization in accordance with the invention. In particular, FIG. 12A is an example of the Java code that implement the synchronization and searching functions described above. FIGS. 12B1 and 12B2 illustrates an example of the transcript HTML page that is being embedded into the iframe that is downloaded to the client computer.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An apparatus for synchronizing a transcript to a presentation, comprising:
   a client computer;
   a server computer that generates and delivers presentation data to the client computer over a computer network, the presentation data comprising media data, transcript data and a synchronization module;
   the client computer further comprising a browser application being executed by the client computer that receives the presentation data wherein the synchronization module is executed by the browser application on the client computer in order to synchronize the media data and the transcript data.

2. The apparatus of claim 1, wherein the synchronization module further comprises an iframe embedded into a web page being viewed using the browser application.

3. The apparatus of claim 2 wherein the iframe further comprises a plurality of computer instructions that are executed to perform the synchronization of the media data and the transcript data.

4. The apparatus of claim 3, wherein plurality of computer instructions further comprise java code.

5. The apparatus of claim 1, wherein the synchronization module further comprises computer instructions that highlight a piece of text of the transcript data that is synchronized to the media data currently being presented using the browser application.

6. The apparatus of claim 5, wherein the synchronization module further comprises a search module having computer instructions that perform a textual search of the transcript data to locate matching pieces of text.

7. The apparatus of claim 6, wherein the search module further comprises computer instructions that generate a hyperlink for each located piece of text.

8. The apparatus of claim 7, wherein the search module further comprises computer instructions that, upon the selection of a particular hyperlink, reposition the transcript data to the selected piece of text associated with the particular hyperlink, highlight the selected piece of text and repositions the media data at the selected piece of text.

* * * * *